United States Patent [19]

Galfant

[11] Patent Number: 5,104,152

[45] Date of Patent: Apr. 14, 1992

[54] WELDED PIPE JOINT

[75] Inventor: Frederick S. Galfant, Oakville, Canada

[73] Assignee: Shaw Industries, Toronto, Canada

[21] Appl. No.: 442,080

[22] Filed: Nov. 28, 1989

Related U.S. Application Data

[63] Continuation-in-part of Ser. No. 342,014, Apr. 24, 1989, abandoned.

[30] Foreign Application Priority Data

Sep. 29, 1989 [CA] Canada ................................. 614564

[51] Int. Cl.⁵ ............................................. F16L 11/12
[52] U.S. Cl. ....................................... 285/47; 285/55; 285/286
[58] Field of Search ...................... 285/286, 55, 22, 47

[56] References Cited

U.S. PATENT DOCUMENTS 2,764,426 9/1956 Von Ahrens ......................... 285/22
3,508,766 4/1970 Kessler et al. ..................... 285/55 X
3,516,689 6/1970 Binford et al. .................... 285/55 X
3,794,358 2/1974 Allen et al. ....................... 285/286 X
4,120,083 10/1978 Echols ............................... 285/55 X

FOREIGN PATENT DOCUMENTS 869429 4/1971 Canada .
1022510 3/1966 United Kingdom ................ 285/286

Primary Examiner—Dave W. Arola
Attorney, Agent, or Firm—Ridout & Maybee

[57] ABSTRACT

A welded pipe joint for pipes which are internally lined for carrying corrosive fluids is formed by an internally lined insert extending into the belled end sections of the pipes to be joined and engaging the belled end sections with a mechanical interference fit. The insert, which is provided with a heat shield to retard the transfer of heat during a subsequent welding operation, is held in coaxial alignment with the pipes while the adjacent ends of the pipes are brought together. The adjacent ends of the pipes are finally welded to complete the joint.

2 Claims, 4 Drawing Sheets

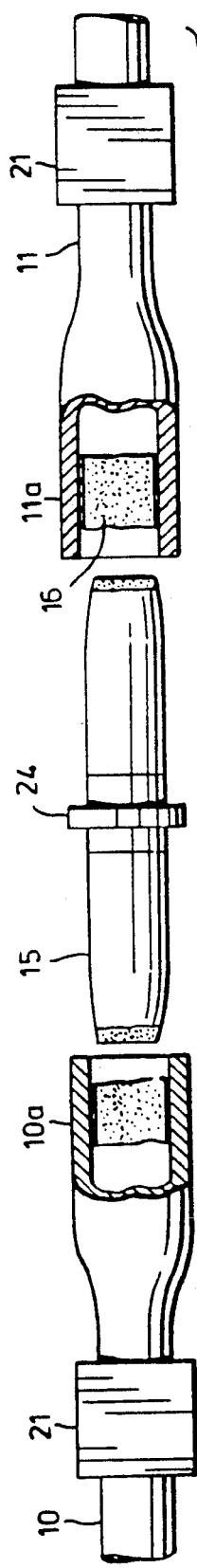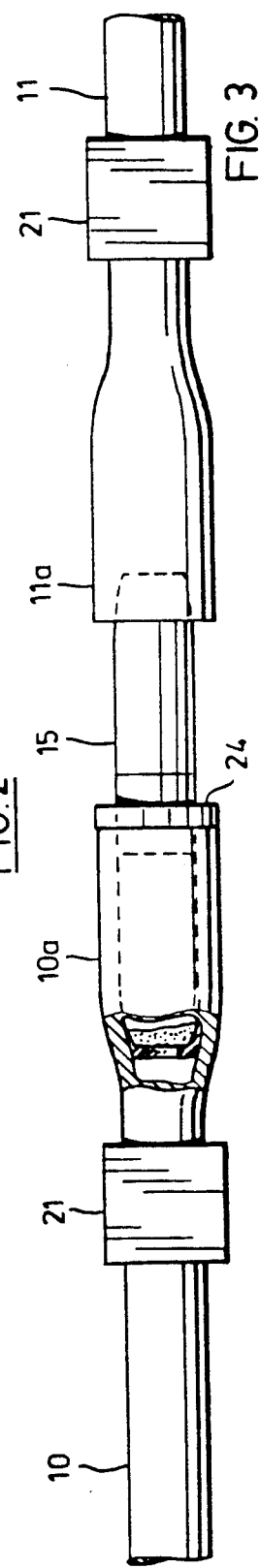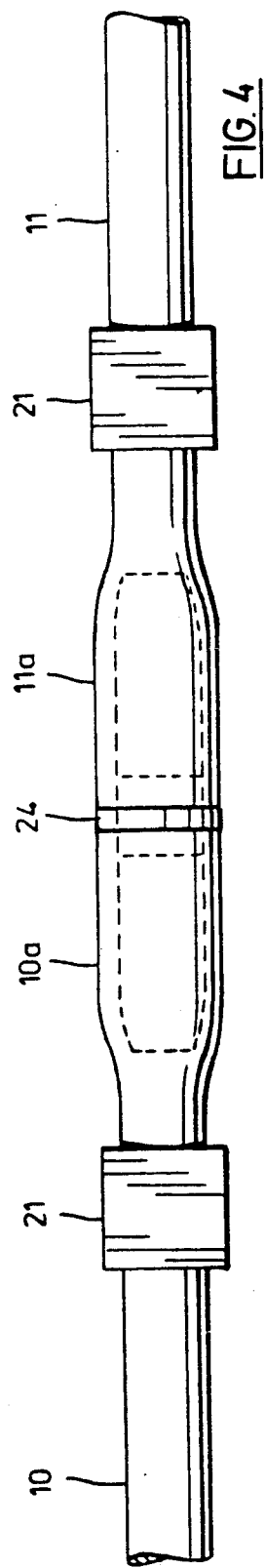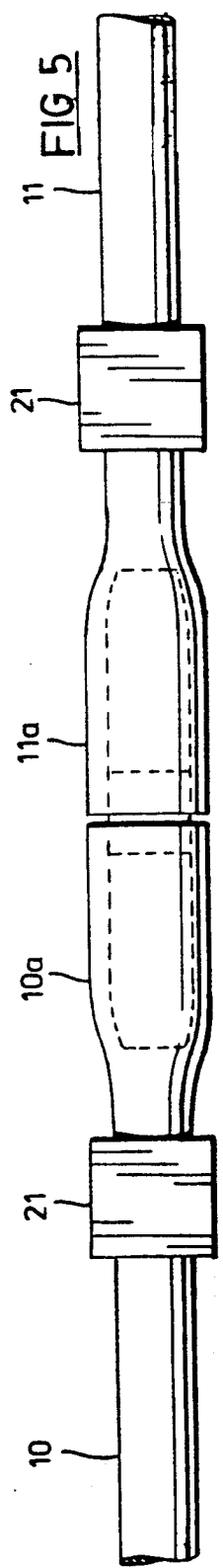

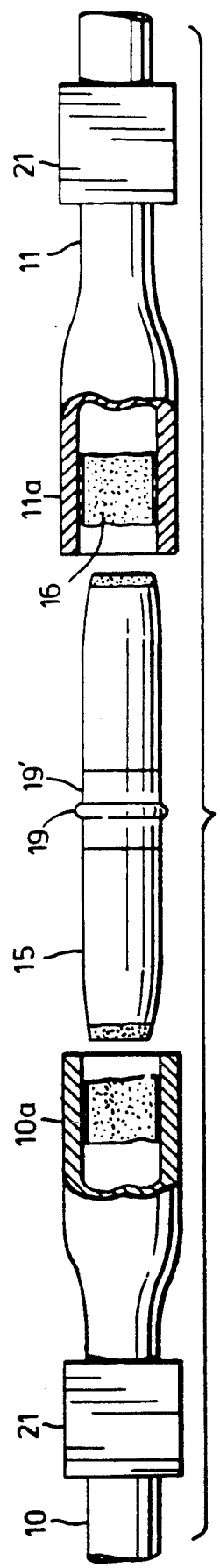
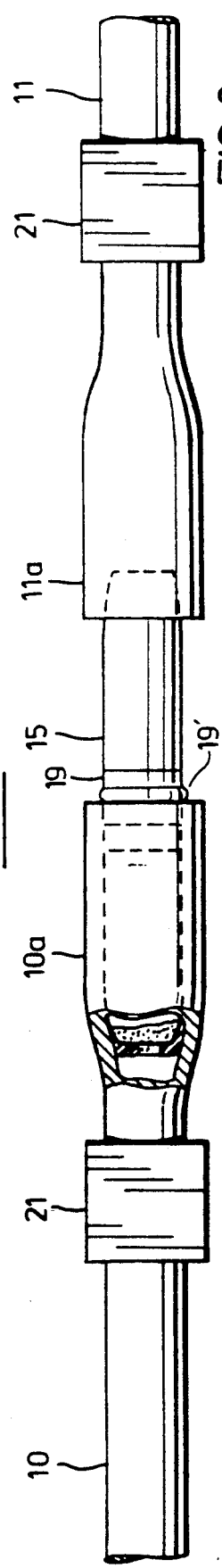
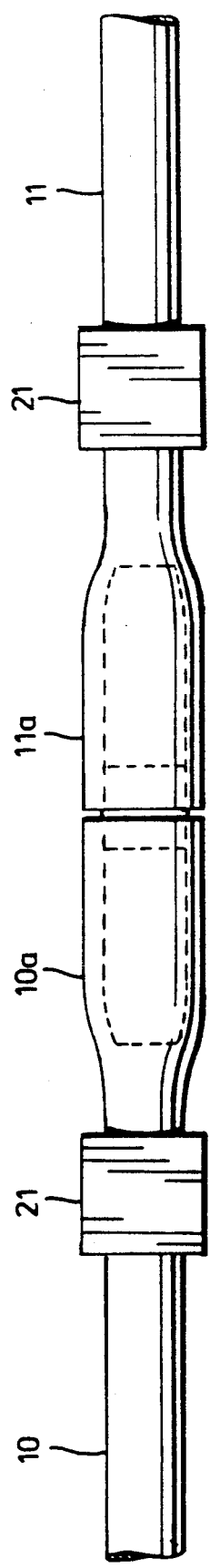
FIG. 7
FIG. 8
FIG. 9

WELDED PIPE JOINT

CROSS REFERENCE TO RELATED APPLICATION

This application is a continuation-in-part of my co-pending application Ser. No. 07/342,014 filed on Apr. 24, 1989 and now abandoned.

FIELD OF THE INVENTION

This invention relates to welded pipe joints and is particularly concerned with the joining of metal pipes which are internally lined with corrosion resistant material to protect the metal of the pipes from attack by internally contained corrosive fluids. It is important in such a pipe joint that the corrosion resistant lining should remain effectively continuous throughout the joint

BACKGROUND OF THE INVENTION

One well known type of pipe joint, known as the "Zap Lok" joint is described in Canadian Patents Nos. 869429 and 1103340 (or U.S. Pat. Nos. 4,064,619 and 4,120,083). This is not a welded pipe joint, but is a pin and bell joint making use of a mechanical interference fit. While the "Zap Lok" joint, which is especially suitable for externally coated pipes, is mechanically strong and reliable, it may not be used with pipes that have to carry corrosive or hazardous fluids since in many such applications only welded joints are allowed.

Another known type of pipe joint, known as the "Thru Kote" joint is described in U.S. Pat. No. 3,508,766. This joint is designed particularly for internally lined pipes. The pipes have belled ends which are welded together, a lined insert being accommodated within the belled ends of the pipes to provide continuity of the lining protection through the joint. However, a serious shortcoming of this joint is that leaks may develop in the annular regions between the ends of the insert and the belled ends of the pipes, and in assembling the joint where centering is difficult there is nothing to prevent movement of the insert prior to the actual welding step; in other words, the sealing material of the joint can be disturbed during assembly.

SUMMARY OF THE INVENTION

The present invention provides an improved welded pipe joint, and method of fabricating the joint, which makes use of a lined insert to preserve continuity of the lining throughout the joint and in which the insert is securely maintained in position throughout the assembly procedure.

Thus, in accordance with the invention, there is provided a welded pipe joint between abutting ends of a pair of metal pipes which are internally lined with corrosion resistant material, the pipes having belled end portions which are connected to the remaining portions of the pipes by inwardly tapering transition regions. A tubular metal insert having tapering end portions is disposed coaxially within the adjacent belled end portions of the pipes, the insert engaging the belled end portions of the pipes with a mechanical interference fit. The internal surface of the insert is lined with corrosion resistant material, and the ends of the insert define with said transitions regions circumferentially extending pockets filled with sealant material, which together with the lining of the insert forms a continuous corrosion resistant lining throughout the joint. Heat retardant means extending circumferentially around the insert at a location beneath the abutting ends of the pipes extends axially within the belled end portions to provide a heat shield for retarding the transfer of heat through the insert to the linings during welding. The joint is completed by a continuous girth weld joining the abutting ends of the pipes.

The tubular insert is preferably of the same metal as the pipes, or is electrochemically equivalent, so that no electrochemical corrosion cell can be set up between them.

BRIEF DESCRIPTION OF THE DRAWINGS

An exemplary embodiment of the invention will now be described with reference to the accompanying drawings, in which:

FIGS. 2 to 5 illustrate successive stages in the assembly of the pipe joint prior to welding;

FIGS. 7 to 9 illustrate successive stages in an alternative method of assembly of the pipe joint prior to welding.

DESCRIPTION OF THE PREFERRED EMBODIMENTS

Figure 1:
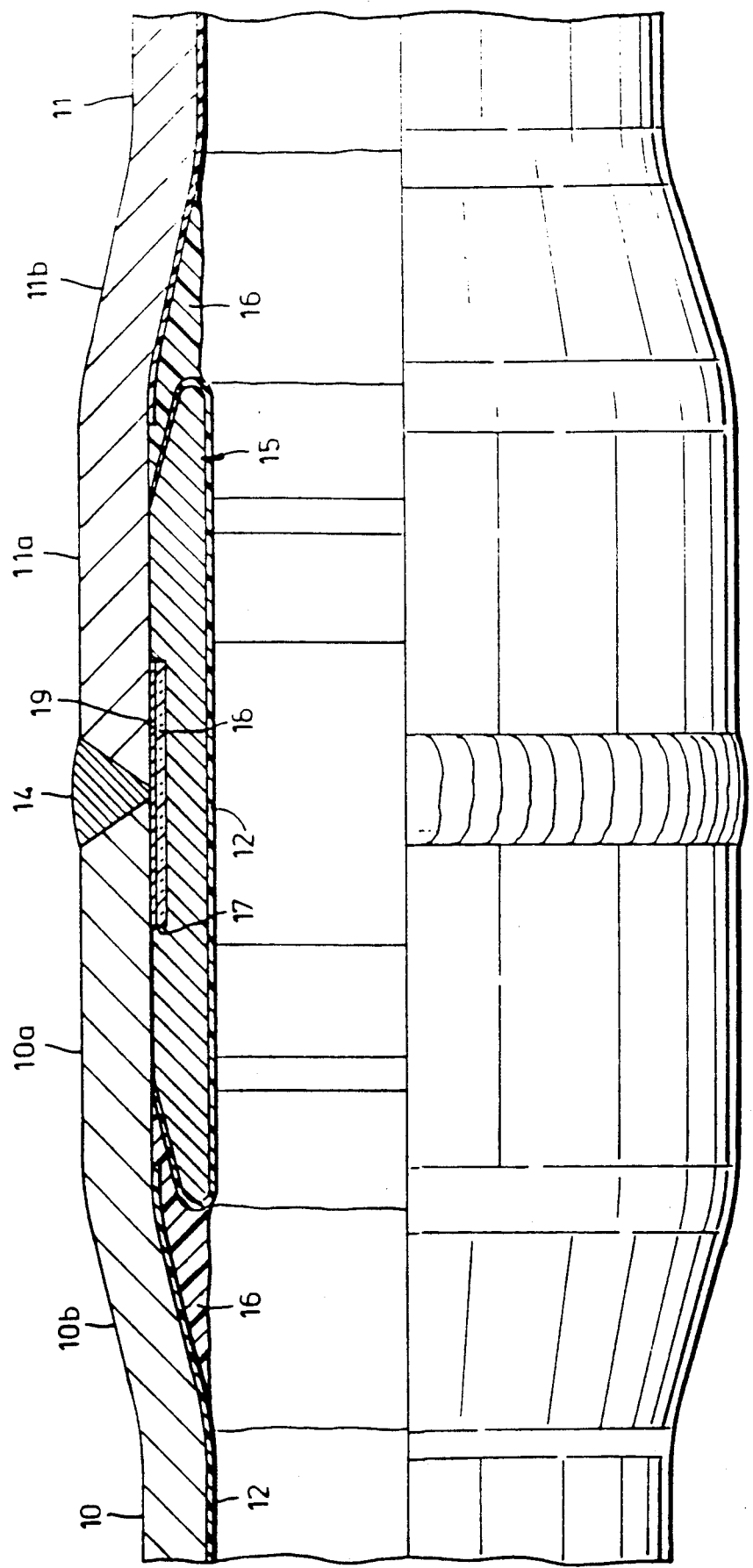
FIG. 1 is a sectional elevation of a pipe joint according to the invention.

Referring to FIG. 1, the pipes 10, 11 to be joined are intended to carry corrosive fluids and are typically of steel or other metal susceptible to attack by the fluid being carried. The pipes are therefore lined internally by a coating of corrosion resistant material 12. The particular material and the thickness of the coating will be selected according to the fluid to be carried in any particular case as well as the environmental conditions to which the pipes are exposed. Typical corrosion resistant materials for the purpose include thermoplastic materials such as polyethylene, polyvinyl chloride and nylon, and thermosetting resins such epoxy and phenolic resins.

The pipes have belled end portions 10a, 11a which are connected to the remaining portions of the pipes by transition regions 10b, 11b of progressively changing diameter. The flare angles of the transition regions should be kept small so as to keep the expansion of the steel (or other metal) of the pipes within approved limits, as set for example by the American Petroleum Institute. The adjacent ends of the pipes are welded together in abutting relation by a continuous girth weld 14.

Disposed coaxially within the belled end portions 10a, 11a of the pipes is a tubular insert 15. This insert is preferably of the same steel or other metal as the pipes 10, 11, or is at least one having the same electrochemical properties so as to avoid the risk of an electrochemical corrosion cell being set up between different metals of the joint. The ends of the insert 15 are cold formed or machined to a tapering shape conforming to the shape of the belled portions 10b, 11b, of the pipes and allow easy insertion of the insert during assembly. The non-tapered ends of the insert 15 engage the belled end portions of the pipes with a mechanical interference fit. As shown in FIG. 1, each of these ends provides a step which defines, together with the adjacent transition region 10b, 11b of a pipe, a circumferential groove which is filled with a lubricant serving also as a sealant 16. A suitable sealant for the purpose is NAPGUARD 7-0056 TM.

The internal diameter of the insert 15 is substantially the same as that of the pipes 10, 11, thus maintaining a continuous flow passage of substantially constant diameter throughout the joint. The internal surface of the insert 15 is lined with a coating of the corrosion resistant material 12 which, together with the sealant 16, and the lining of the pipes provides a continuous corrosion resistant lining throughout the flow passage.

The external surface of the insert is machined to provide a continuous, circumferentially extending cylindrical slot 17 which is located midway between the ends of the insert and therefore located beneath the abutting welded ends of the pipes. The slot 17 is filled with heat insulation material 18, such as Kaowool TM paper, and is covered by a heat shield 19. The heat shield 19 is of the same axial length as the slot, thus providing with the heat insulation material 18 a heat retardant means serving to retard the transfer of heat during the welding of the joint through to the corrosion resistant linings, which would be damaged by overheating. The heat shield 19 is preferably of the same metal as the pipes 10, 11 and the insert 15, or of a metal having equivalent electrochemical properties to avoid the risk of setting up an electrochemical corrosion cell within the joint. The heat shield 19 can be considered a weld backing or consumable during the welding process.

The method of fabricating the welded pipe joint will now be described with reference to FIGS. 2 to 6.

The corrosion resistant coating 12 is applied holiday free to the entire internal surface of the tubular insert 15, to the ends of the insert, and to the tapered end portions of the external surface of the insert. This coating material is selected according to the conditions it must withstand. Thus, for example, on 60 mm steel pipe it must be capable of withstanding heat from welding up to 200° C. The coating must also be capable of withstanding very corrosive environments in service, for example 150° C., 40 MPa, with salts, hydrocarbons, solvents, hydrogen sulphide, carbon dioxide etc. The uncoated portion of the external surface of the insert 15, particularly where it will engage the belled portions of the pipes to make a mechanical interference fit, should be relatively free from grease and scale.

The lubricating sealant 16 must be capable of lubricating the outside of the insert 15 during insertion of the latter into the belled end portions of the pipes, and must not flow due to heat from the welding process. The lubricating sealant must also be capable of bonding well to the corrosion resistant material 12 and surviving in the same corrosive environment.

Figure 6:
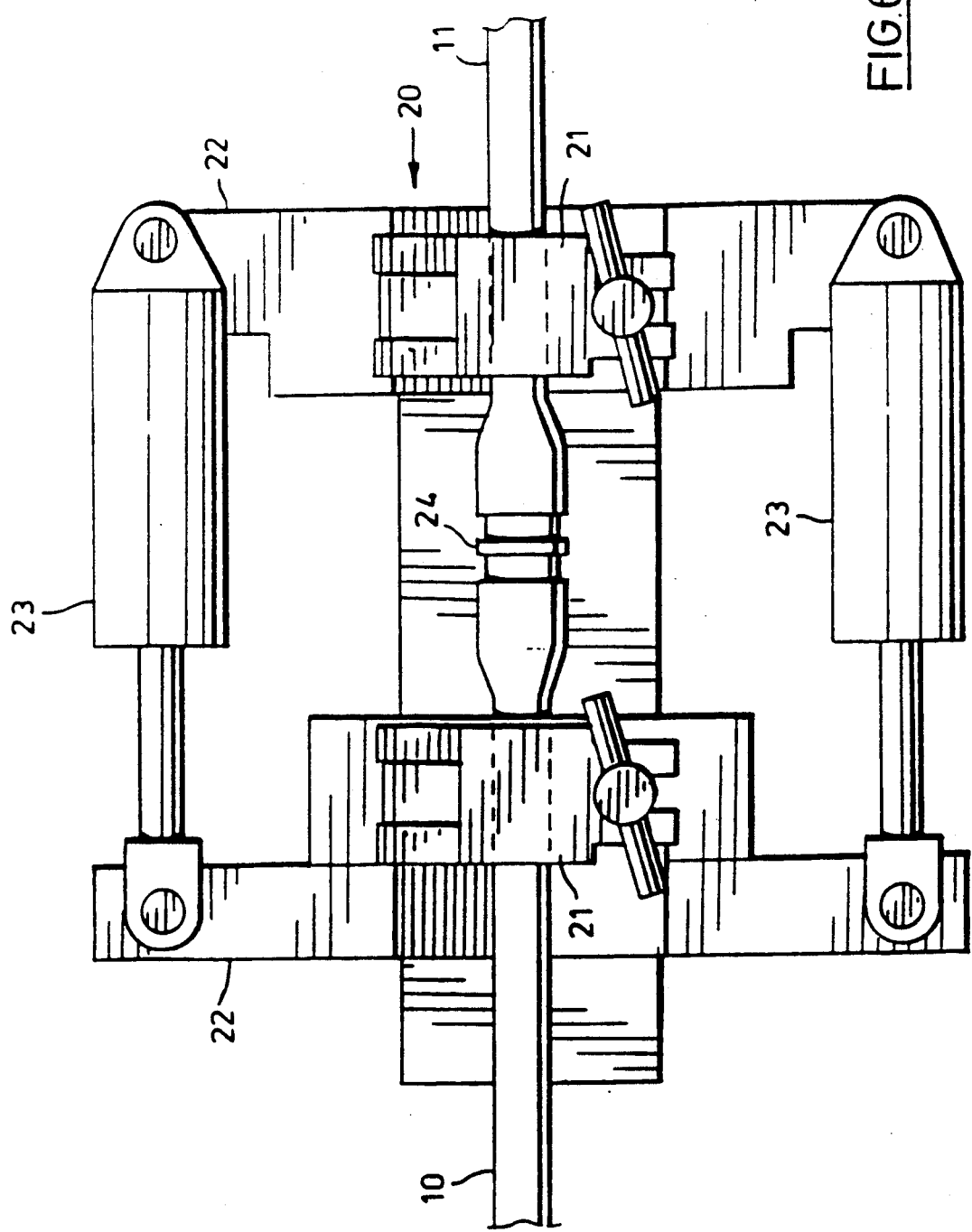
FIG. 6 illustrates diagrammatically an assembly press used in assembling the pipe joint.

Prior to assembly, the pipe ends are belled in the manufacturing plant and the insert 15 is cold formed or machined to shape. The entire inside surfaces of the pipes and the insert are then coated with the corrosion resistant material 12 in the coating plant. The pipe joint can then be assembled in the plant or in the field using an assembly press 20 as shown in FIG. 6. The pipes 10, 11 to be joined are held in horizontal coaxial alignment by respective slip clamps 21 of the press 20, the slip clamps 21 being rigidly mounted in yoke members 22. The yoke members 22 are interconnected by hydraulic jacks 23 for operating the press.

The press 20, may be the known type of assembly press referred to in U.S. Pat. No. 4,064,619. A centering ring 24, in the form of an external slip, is positioned midway between the ends of the insert and in axial alignment with the insert and the slip clamps 21. The insert 15 is gripped by the centering ring 24 and the pipes 10, 11 are gripped by the slip clamps 21, the jacks 23 being fully extended as shown in FIG. 2. In this condition the heat retarding means 18, 19 is located inside the centering ring. The lubricating sealant 16 is next applied to the whole inside surfaces of the belled end portions of the pipes, after which the assembly press is operated while the insert 15 is held in position as the press (FIG. 3) draws the pipe ends towards one another. The insert 15 remains correctly aligned with the pipes and the heat retarding means remains correctly centered with respect to the pipes. In this position, shown in FIG. 4, the centering ring 24 is opened and removed, whereupon the assembly press is again activated bringing the adjacent ends of the pipes together, and leaving a suitable welding gap of 1 to 2 mm as shown in FIG. 5. The pipes can now be removed from the press, while so connected together and are ready to be welded. The mechanical interference fit between the belled end portions of the pipes and the non-tapered end portions of the insert is completed at this stage. The joint is completed by welding together the abutting ends of the pipes. The welding may be accomplished by normal welding procedures but is preferably accomplished by the procedure outlined in U.S. Pat. No. 3,508,766, the disclosure of which is incorporated herein by reference, to minimize heat build up and to allow for release of welding gases.

In an alternative method of assembly, illustrated in FIGS. 7 to 9, the tubular heat shield 19 is preformed with a continuous circumferential ridge 19' midway between its ends. The ridge 19' must be high enough and stiff enough to ensure that it will stop against the belled pipe end during insertion of the insert 15 into the pipe end, but it must not be so bulky as to interfere with the welding of the joint after assembly. The pipe joint can be assembled in the plant or in the field using the assembly press shown in FIG. 6, except that the centering ring 24 (FIG. 6) is not needed. As previously described, the pipes 10, 11 are gripped by the slip clamps 21 of the assembly press, the jacks of the latter being fully extended. The lubricating sealant 16 is next applied to the whole inside surfaces of the belled portions of the pipes, after which the assembly press is operated while the insert 15 is held in position in coaxial alignment with the pipe ends as the press draws the pipe ends towards one another (FIG. 8). The insert 15 remains correctly aligned with the pipes and the heat retarding means 19 remains correctly centered with respect to the pipes. In this case the ridge 19' of the head shield acts as a stop which abuts against one or other of the pipe ends. Continued operation of the press brings the adjacent ends of the pipes together, the ridge 19' defining a suitable welding gap of 1 to 2 mm. as shown in FIG. 9. The pipes can now be removed from the press, while so connected together and are ready to be welded. The mechanical interference fit between the belled end portions of the pipes and the non-tapered end portions of the insert is completed at this stage. The joint is completed by welding together the abutting ends of the pipes. The welding may be accomplished by normal welding procedures but is preferably accomplished by the procedure outlined in U.S. Pat. No. 3,508,766, the disclosure of which is incorporated herein by reference, to minimize heat build up and to allow for release of welding gases.

While a particular embodiment of the invention has been described with reference to the accompanying drawings, it is to be understood that the particular description is by way of example only and the invention is not limited thereby.

I claim:

1. A welded pipe joint between abutting ends of a pair of metal pipes which are internally lined with corrosion resistant material, the pipes having belled end portions connected to the remaining portions of the pipes by inwardly tapering transition regions, comprising a tubular metal insert having tapering end portions disposed coaxially within the adjacent belled end portions of the pipes, the insert engaging said belled end portions of the pipes with a mechanical interference fit, the ends of the insert defining with said transition regions circumferentially extending pockets filled with sealant material, the insert having an internal surface lined with corrosion resistant material and having an internal diameter substantially equal to that of said remaining portions of the pipes, the corrosion resistant material and sealant forming a continuous corrosion resistant lining throughout the joint, heat retardant means extending circumferentially around the insert at a location beneath the abutting ends of the pipes, said heat retardant means extending axially along the belled end portions of the pipes to retard the transfer of heat through the insert to the linings during welding, and a continuous girth weld joining said abutting ends of the pipes, wherein the insert has an external surface which is machined to provide a continuous circumferentially extending pocket intermediately between the tapered end portions of the insert, and wherein said heat retardant means comprises thermal insulation filing the pocket and a continuous metal ring overlying the thermal insulation between it and the girth weld.

2. A welded pipe joint according to claim 1, wherein the tubular insert, the metal ring, and the pipes are of the same metal or electrochemically equivalent metals.

* * * * *